United States Patent
Nordstrom

(10) Patent No.: US 8,926,409 B2
(45) Date of Patent: Jan. 6, 2015

(54) HANDHELD MACHINE

(75) Inventor: Caj Nordstrom, Jeppo (FI)

(73) Assignee: Oy KWH Mirka AB (FI)

( * ) Notice: Subject to any disclaimer, the term of this patent is extended or adjusted under 35 U.S.C. 154(b) by 196 days.

(21) Appl. No.: 13/478,375

(22) Filed: May 23, 2012

(65) Prior Publication Data

US 2012/0302143 A1 Nov. 29, 2012

(30) Foreign Application Priority Data

May 25, 2011 (EP) .................................... 11167443

(51) Int. Cl.
| | | |
|---|---|---|
| *B24B 55/00* | (2006.01) | |
| *B24B 23/02* | (2006.01) | |
| *B23Q 11/00* | (2006.01) | |
| *B24B 23/00* | (2006.01) | |
| *B25F 5/02* | (2006.01) | |
| *B25G 1/00* | (2006.01) | |

(52) U.S. Cl.
CPC .......... *B24B 23/026* (2013.01); *B23Q 11/0092* (2013.01); *B24B 23/005* (2013.01); *B24B 55/00* (2013.01); *B25F 5/02* (2013.01); *B25G 1/002* (2013.01)
USPC ............ 451/344; 451/357; 451/358; 451/359

(58) Field of Classification Search
CPC .... B24B 55/06; B24B 23/022; B24B 23/023; B24B 23/024; B24B 23/028; B25G 1/10
USPC ............ 451/354–359, 442, 456, 344; 30/133; 16/426
See application file for complete search history.

(56) References Cited

U.S. PATENT DOCUMENTS

| | | | | |
|---|---|---|---|---|
| D256,881 | S | * | 9/1980 | Hutchins ........................ D8/62 |
| 4,531,329 | A | * | 7/1985 | Huber ........................... 451/456 |
| D324,800 | S | * | 3/1992 | Butzen et al. .................... D8/62 |
| D324,803 | S | * | 3/1992 | Butzen et al. .................... D8/62 |
| 5,135,190 | A | * | 8/1992 | Wilson ........................ 248/118.1 |
| D334,126 | S | * | 3/1993 | Huber et al. ..................... D8/62 |
| D350,266 | S | * | 9/1994 | Huber et al. ..................... D8/62 |
| D353,984 | S | * | 1/1995 | Izumisawa ...................... D8/62 |
| D357,163 | S | * | 4/1995 | Izumisawa ...................... D8/62 |
| 5,528,834 | A | * | 6/1996 | Seber et al. ...................... 30/340 |
| 5,538,040 | A | * | 7/1996 | Huber et al. ............. 137/614.19 |
| D377,892 | S | * | 2/1997 | Sung ................................ D8/62 |
| D381,570 | S | * | 7/1997 | Sung ................................ D8/62 |
| D386,377 | S | * | 11/1997 | Sung ................................ D8/62 |
| 5,772,498 | A | * | 6/1998 | Neubert et al. ............... 451/357 |
| D427,498 | S | * | 7/2000 | Price et al. ....................... D8/62 |
| D436,817 | S | * | 1/2001 | Leu ................................. D8/62 |

(Continued)

FOREIGN PATENT DOCUMENTS

| | | |
|---|---|---|
| DE | 298 16 970 | 1/2000 |
| DE | 29816970 | 1/2000 |

(Continued)

*Primary Examiner* — George Nguyen
(74) *Attorney, Agent, or Firm* — Altera Law Group, LLC

(57) ABSTRACT

A handheld machine, comprising a first grip (106) for receiving a first hand of a user of the machine, a second grip (118) for receiving a second hand of the user of the machine, and at least one coupling (114) for connecting the handheld machine to a flexible line (116). The second grip (118) extends in its usage position over the coupling (114) but is displaceable from this position.

14 Claims, 4 Drawing Sheets

(56) References Cited

U.S. PATENT DOCUMENTS

| | | | | |
|---|---|---|---|---|
| D438,078 S | * | 2/2001 | Leu | D8/62 |
| D458,102 S | * | 6/2002 | Tseng | D8/62 |
| D464,857 S | * | 10/2002 | Morgan | D8/62 |
| D465,141 S | * | 11/2002 | Morgan | D8/62 |
| D470,278 S | * | 2/2003 | Liang-Ming | D32/15 |
| 6,669,543 B2 | * | 12/2003 | Price et al. | 451/357 |
| 6,699,111 B2 | * | 3/2004 | Legner et al. | 451/344 |
| D494,434 S | * | 8/2004 | Sun et al. | D8/62 |
| D511,953 S | * | 11/2005 | Janson | D8/62 |
| D516,398 S | * | 3/2006 | Janson | D8/62 |
| D667,285 S | * | 9/2012 | Welsch et al. | D8/62 |
| 2001/0004580 A1 | | 6/2001 | Legner et al. | |
| 2003/0083005 A1 | | 5/2003 | Price et al. | |
| 2003/0143935 A1 | * | 7/2003 | Huber | 451/357 |
| 2003/0228833 A1 | * | 12/2003 | Boyer | 451/344 |
| 2008/0045127 A1 | | 2/2008 | Lampka et al. | |
| 2010/0099341 A1 | * | 4/2010 | Huber et al. | 451/357 |

FOREIGN PATENT DOCUMENTS

| | | |
|---|---|---|
| DE | 20 2010 012818 | 11/2010 |
| DE | 202010012818 | 11/2010 |
| EP | 1 136 181 | 9/2001 |
| WO | WO 2006/134742 | 12/2006 |

* cited by examiner ial, such as dust, paint, dirt and so on, developed during the sanding/grinding/polishing, is suctioned away from the working area through the extraction hose 112.

HANDHELD MACHINE

FIELD

The invention relates to a handheld machine, such as a sander or a polisher.

BACKGROUND

Sanding and polishing work using an electric or pneumatic machine faces many challenges. On curved and complicated surfaces the machine needs to be very agile and easy to turn, when again on big surfaces there is need to keep up high sanding pressure in a static manner for long periods. The operator should be able to easily change working grip between one-hand and two-hand modes to avoid static stress. This same requirement arises also from that sometimes the working space is so narrow that it enables working with only one hand, whereas on greater continuous surfaces use of two hands would be preferable.

Current handheld machines are often intended and adapted for either one-hand or two-hand use but seldom properly suit for both modes of operation.

SUMMARY

An object of the invention is to alleviate the above disadvantage. This is achieved with the invention defined in the independent claim. Some embodiments are disclosed in the dependent claims.

DRAWINGS

The invention will now be explained in more detail referring to the accompanying drawings, wherein FIG. 1A shows a side view of an embodiment of a handheld machine;

Figure 2:
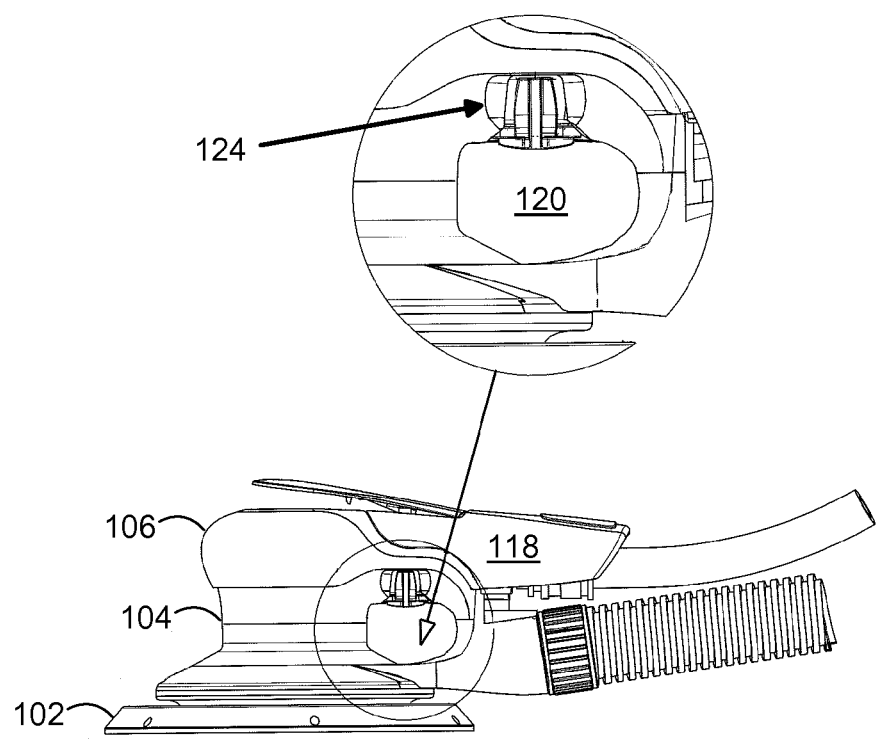
Figure 3A:
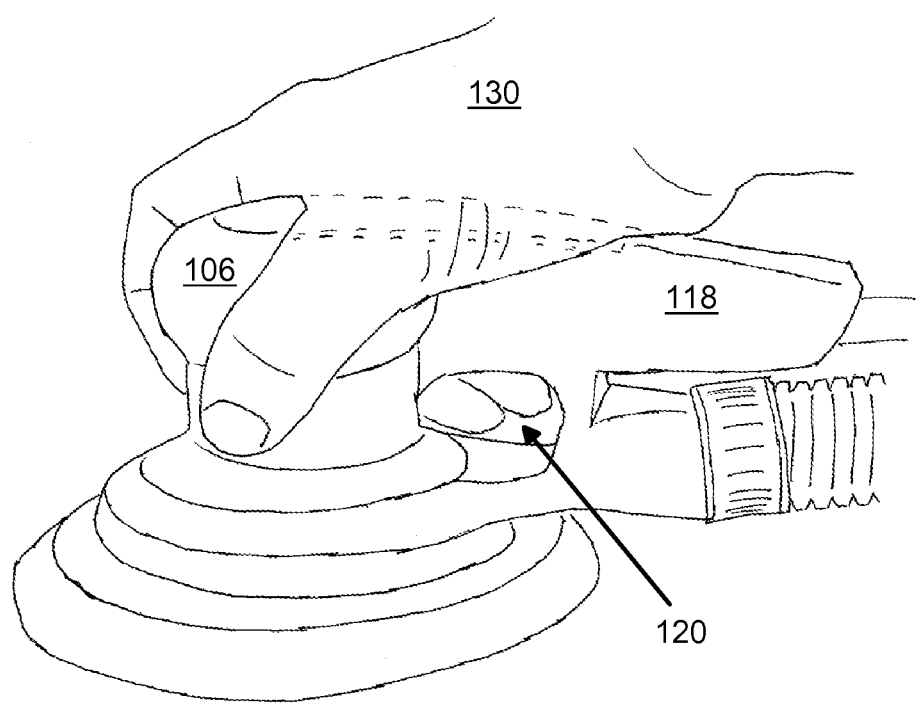
Figure 3B:
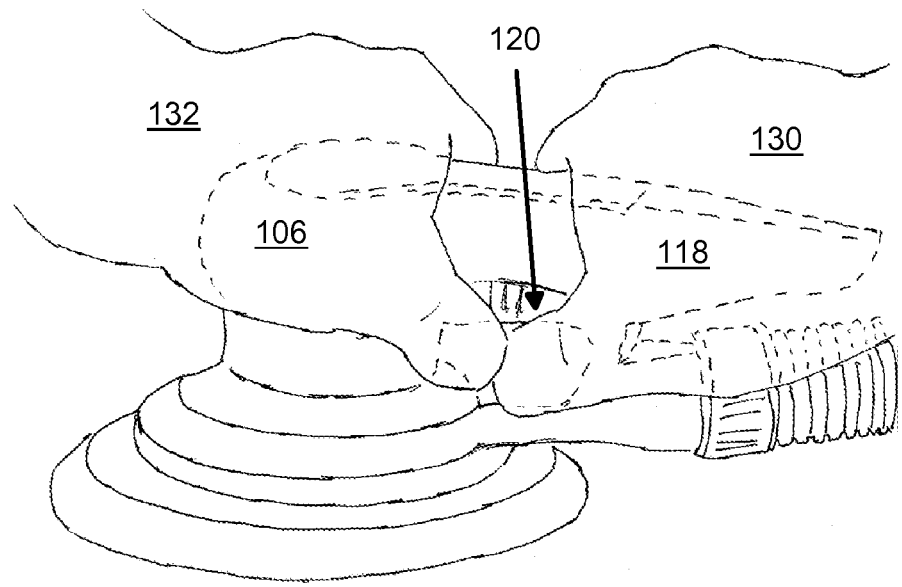
Figure 4:
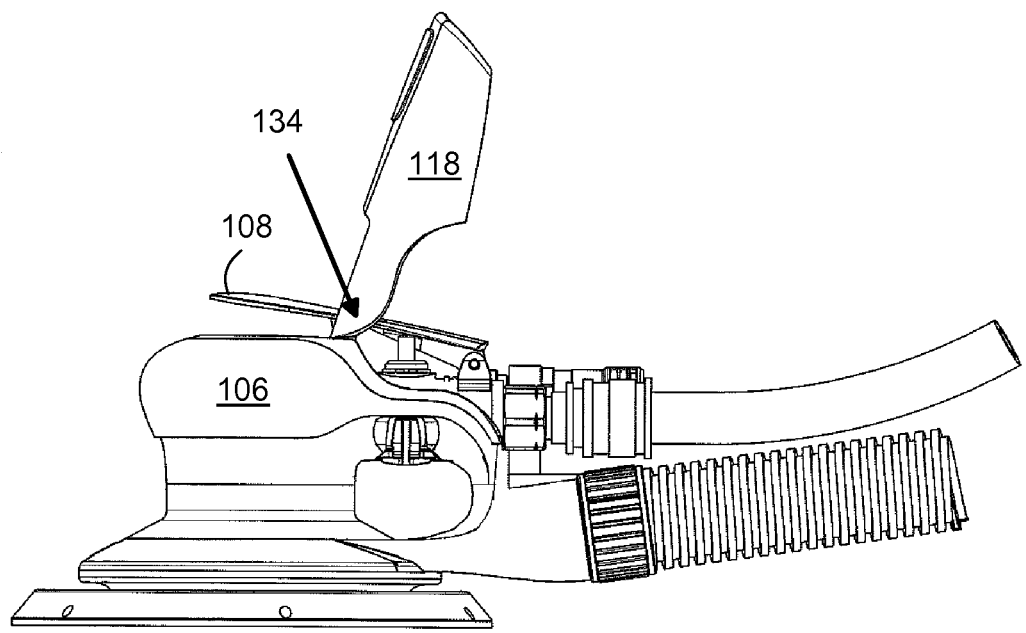
Figure 5A:
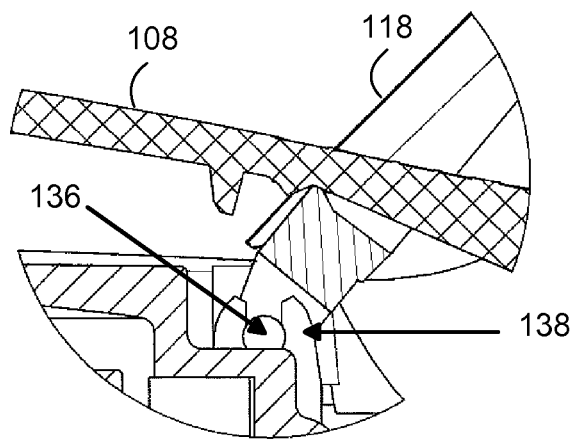
Figure 5B:
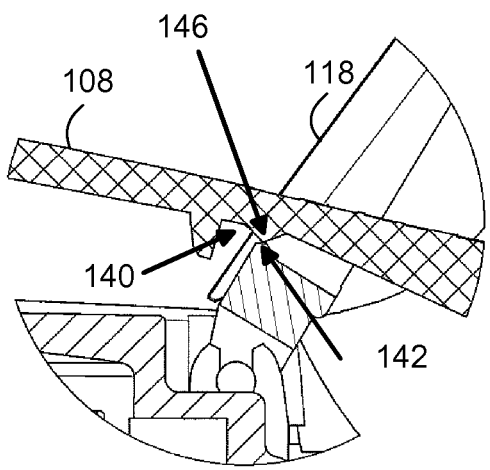
Figure 5C:
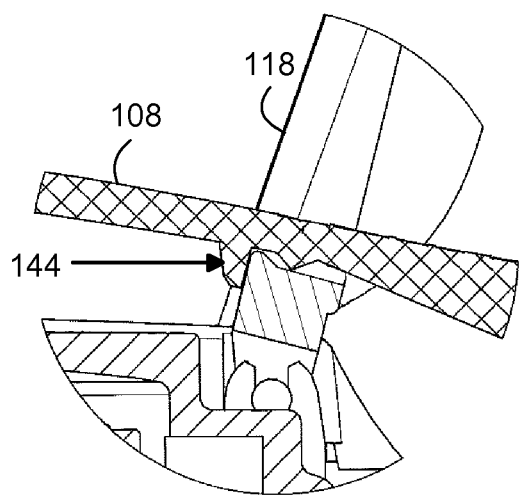

FIG. 2 highlights a gripping tunnel in an embodiment of a handheld machine;

FIG. 3A highlights gripping of a handheld machine with one hand;

FIG. 3B highlights gripping of a handheld machine with two hands;

FIG. 4 shows another embodiment of a handheld machine;

FIGS. 5A to 5C highlight locking of an actuating lever.

DESCRIPTION OF SOME EMBODIMENTS

The following embodiments relate to powered machines/tools, such as grinding, sanding or polishing machines. The machine may be pneumatically or electrically powered and have respective couplings therefor.

Figure 1A:
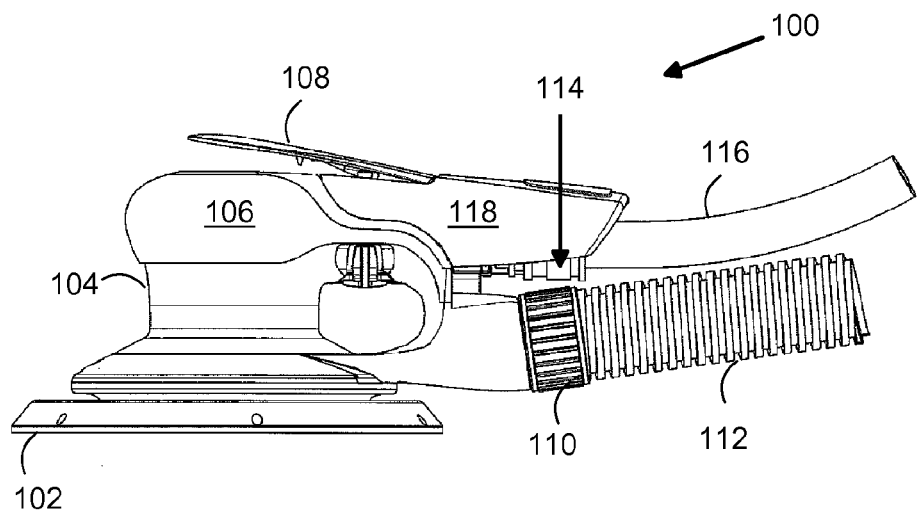
FIG. 1B shows the top view of the handheld machine of FIG. 1A.
FIG. 1C shows the embodiment of FIG. 1A as a perspective view.

FIG. 1A shows one embodiment of a sanding machine 100. The device has a rotary and/or oscillating circular sanding disk 102, to which abrasive material can be attached. The rotary and/or oscillating motion of the sanding disk is provided by a motor arranged in the motor housing 104. In other embodiments the sanding tool may have other forms, rectangular or triangular and is then only oscillating.

Above the motor housing 104 there is provided a grip 106, which is specially adapted to be gripped with one hand. The grip may be round and sized such that when the palm of the hand rests against the top surface of the grip, the fingers set around the grip 106. In the proximity of the grip, there is arranged an actuating lever 108, which controls the functioning of the motor. The motor operates only when the actuating lever 108 is depressed against the grip 106. When the user wishes to stop the motor, he/she releases the grip 106, and the actuating lever returns to the position shown in FIG. 1 thereby stopping the motor.

As can be seen, the grip 106 is positioned substantially above the disk 102. In one embodiment, the grip is centrally positioned with respect to the disk. That is, the middle axis of the round grip coincides with the middle axis of the disc and the motor. In this way, the device is optimized for one-hand use, because a pressing force exerted by the user on the grip delivers the same pressing force on the disk 102 via the rigid motor housing 104. In another embodiment, the mutual positioning of the grip 106 and the disk 102 may be slightly eccentric.

FIG. 1A also shows an exhaust coupling 110 for connecting a flexible dust extraction hose 112 to the machine. Material, such as dust, paint, dirt and so on, developed during the sanding/grinding/polishing, is suctioned away from the working area through the extraction hose 112.

FIG. 1A also shows another coupling 114. The machine of FIG. 1A is assumed to be pneumatically operated and thus the device includes a coupling for connecting a flexible pressure air line/hose 116 to the device. In practice, the device may include, although not shown, two couplings for connecting two pressure air lines, one for incoming, and one for outgoing pressure air.

The sanding machine 100 also contains a second grip 118 for providing support for a second hand of a user. The second grip is an elongated grip, and formed such that the user may set the palm of the hand against the top surface of the grip 118. The thumb of the hand then sets on one side of the grip 118, and the other fingers on the other side of the grip.

Figure 1B:
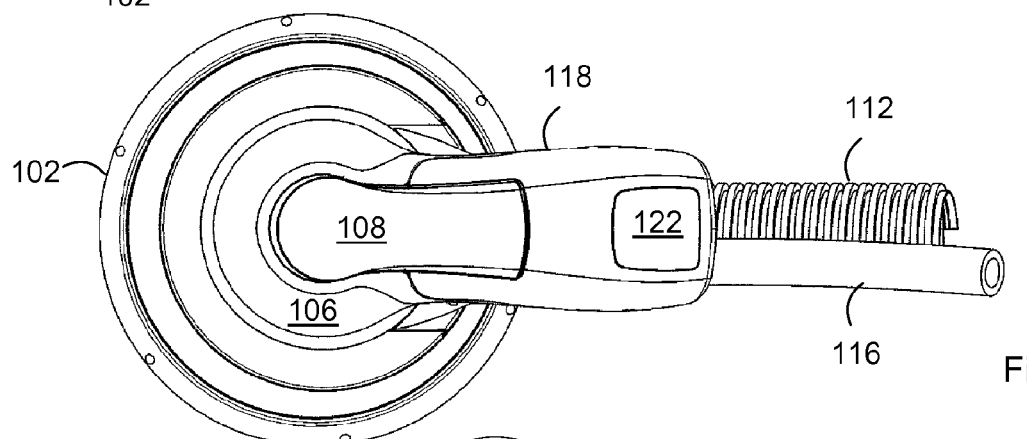

From the top elevation of FIG. 1B it can be seen, that the elongated second grip 118 extends in the horizontal level towards the flexible lines 112, 116 such that it covers the rigid couplings 110, 114 of the flexible lines. In addition to the top wall, the second grip 118 also includes side walls extending from the top wall, and rounded wall portions between the top wall and the side walls. The walls of the second grip cover at least some of the couplings. FIG. 1A shows that the coupling 114 is at least partly and mostly covered, vertically, by the side walls of the grip 118. Thus, during the use of the machine for sanding or polishing, the coupling is covered by the second grip, but the grip is displaceable from this position during maintenance, such as coupling/decoupling of hoses of the machine.

FIG. 1B shows a prepared surface 122 on top of the second grip. The prepared surface may be of rubber, or some other material with high friction, to prevent the second hand from slipping off the grip 118. The prepared surface portion may be changeable and can be given forms, size and surface properties suitable for a specific user.

Figure 1C:
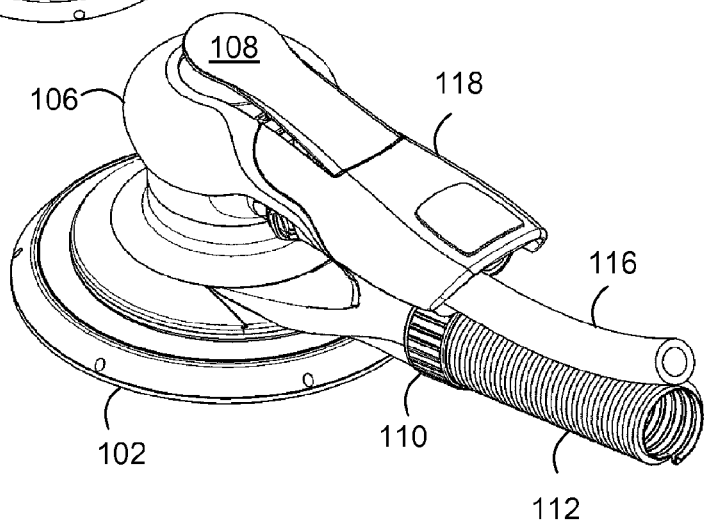

FIG. 1C shows a perspective view of the handheld machine. It can be seen that the second grip 118 has a top surface, side walls extending from the top wall to the sides, and an open bottom. The second grip thus provides only partial coverage for the couplings to facilitate the handling of the couplings if needed.

The various views 1A to 1C illustrate how the second grip 118 is an integral part of a handgrip of the machine. The handgrip can be defined to comprise parts which the user normally grips during the use of the machine. The handgrip thus comprises one or more parts of the following: the first grip 106, the second grip 118, the motor housing 104 and the tunnel below the grips and the motor speed regulator placed therein.

FIG. 1A shows how the side surface between the first grip 106 and the second grip 118 is continuous. From FIG. 1B it is apparent that the grips and the actuating lever 108 form together a continuous and substantially even top surface when the actuating lever 108 is depressed against the first grip 106.

Several advantages are achieved with the shown construction of the second grip 118. First of all, as the second grip is formed such that it at least partly houses the couplings 114, the flexible line/cable, such as a pneumatic connection line, starts as close as possible from the grip/handle 106. Between the couplings 110, 114 and the body of the machine, there is only a short rigid structural part housing valves, for instance. Rigidity at the tail of the machine (on the right) ends thus at the couplings 110, 114, whereafter only flexible lines/pipes/cables follow. As the rigid lines are short, it is easy to turn the machine is.

With the machine shown in FIGS. 1A to 1C, the couplings 110, 114 are housed from top, and from the sides. In a pneumatically operated machine, the air outlet and the exhaust air hose are cold because of the pressure drop in the motor. There may also be some leakage of air at the couplings. There is thus a need to protect the second hand resting on the grip 118 from the couplings, which is especially important during long working sessions.

As the second grip 118 has side walls that extend down to the sides of the couplings, at least covering the pneumatic coupling 114, the user is prevented from touching the couplings and/or the connecting lines in a normal usage situation when the palm of the hand is set against the top surface of the second grip. The cold exhaust airstream is lead away and will not blow into the hand/sleeve of the operator.

It can be seen that the top surface of the second grip 118 coincides with the top surface of the first grip 106, and can be seen as a continuation of the first grip 106. The surface of the second grip is ergonomically optimized to fit the hand, that is, the wall sections between the top surface and the side walls are preferably rounded.

FIG. 2 highlights a detail of a handheld machine. It can be seen that to the right of the motor housing 104, and below the grips 106, 118, there is provided a tunnel 120. The tunnel is a through tunnel extending from one side of the machine to the other side. The tunnel forms a closed and substantially rounded rectangular space.

The tunnel is positioned and dimensioned such that the tunnel can receive at least both thumbs from one side of the machine, and possibly some other fingers, such as forefingers, from the other side of the machine.

At the top part of the tunnel, the machine comprises a speed regulator 124 for controlling the rotating speed of the motor and the disk. In order to improve the comfort for the user, the regulator is integrated into the handle which makes it possible to keep the handle smoother and narrower.

FIG. 3A shows an embodiment of a usage situation of the machine. In this embodiment, the user operates the machine with one hand only. It can be seen that the user has gripped on the first grip 106 such that three fingers set around the grip 106, and the ring finger and the little finger set to the through tunnel. In this example, the palm sets between the grips 106, 118. In a one-hand usage mode, the palm of the right hand could well be more to the left such that the palm of the hand sets substantially against the middle of the grip 106.

FIG. 3B shows another usage situation. In this case, the machine is gripped with both hands. As can be seen, when the palm of the left hand sets against the first grip 106, and the palm of the right hand sets against the second grip 118, the thumbs of both hands are received in the tunnel 120. When used in the two-hand mode of the example, most of the grinding action is carried out with the left hand, which is positioned above the grinding disk. The right hand is eccentrically positioned to the grinding disk, and has merely a guiding function.

By changing the grips this way the user can easily avoid static stress when the right hand can rest in another position only guiding the machine while the left hand now presses the machine against the surface to be sanded. The agility of the machine is although not lower than for a normal one hand machines because the couplings and the tail of the actual machine is of the same length and distance from the center line as on a normal one hand machine.

Although the embodiments of FIGS. 3A and 3B show that the left hand operates the first grip 106 and the right hand the second grip 118, the hands can naturally be used inversely such that the right hand sets on the first grip and the left hand on the second grip. The apparatus may be fully symmetric such that it does not matter which way the hands are used on the grips. For a user with very monotonous operation, this offers more possibilities to variation. Alternatively, the device may be slightly adapted for either of the in the figures shown order of hands, or the inverse order.

FIG. 4 shows another embodiment. In this embodiment, the second grip 118 is pivotably mounted to the machine. The pivot point 134 may be on the second grip close to the first grip. When the second grip is pivoted away, by lifting the tail (on the right) of the second grip upwards, easy access to couplings normally hosted by the second grip is achieved. With the access to the couplings, the respective hoses can be coupled to or decoupled from the couplings.

The pivoting function of the second grip 118 may be operationally coupled to the actuating lever 108 such that when the second grip is pivoted to an upright position, it locks the actuating lever to a position shown in FIG. 4. In this shown position of the actuating lever, the motor of the machine is stopped.

The second grip may have an opening, through which the actuating lever is arranged. When the second grip 118 is lifted, the actuating lever slides in the opening such that the edges of the lever touch the edges of the opening. The walls of the opening and the actuating lever may have locking members, such as male and female locking parts, which engage with to each other when the second grip has been lifted to a sufficiently upright position. The actuating lever is designed as a spring and holds the two parts in the locked position by the levers spring force. The second grip can be disengaged from the actuating lever/switch by releasing the locking between the two.

FIGS. 5A to 5C highlight the co-operation of the second grip 118 and the actuating lever 108. The figures also show an embodiment of the pivoting mechanism of the second grip. The second grip may comprise a pin 136 having a round cross-section. The handheld machine may comprise curved walls 138 hosting the pin 136. In an embodiment, the walls on two sides of the pin are separate and open at the top end of the walls. The walls may be slightly flexible such that the pin 136 can be pressed between the walls 138, and also removed therefrom, if needed.

FIGS. 5A to 5C show the pivoting of the second grip 118 in three different stages. In 5A the pivoting has started, in 5B the pivoting has proceeded to a middle stage, and in 5C the pivoting has proceeded such that the second grip 118 and the actuating lever 108 are locked to each other. In the shown embodiment, the actuating lever has a stoppage wall 144, and a receiving space 140 between a projection 146 and the stoppage wall 144 for receiving a projection 142 of the second grip 118. As can be seen from FIG. 5C, a wall of the second grip 118 lies against the stoppage wall, and the projection 142 has set beyond the projection 146 in the receiving space 140.

The shown embodiment, where the second grip is applied to lock the actuating lever, improves the safety of the user significantly. We may consider a maintenance situation, where the user wishes to change the abrasive sheet attached to the disk. When carrying out this operation, the user may turn the machine upside down and if the machine is placed on the table, for instance, the actuating lever may accidentally become depressed. The disk starts to rotate and may cause an injury to the user.

With the shown solution, this disadvantage is avoided, because the pivoted second grip 118 practically prevents setting the machine upside down on a work surface.

In the above disclosed embodiments, the second grip has been shown to be displaceable from the usage position by pivoting it about a pivot point. In another embodiment, the second grip is removably attached to the machine. The second grip may be a round sleeve, for instance, that can be disengaged from its usage positioned and sled along the flexible hoses such that the couplings become accessible. Such a sleeve can be engaged to the machine with some known snap-in couplers, for instance. Instead of a round sleeve, the second grip may be have a form substantially as disclosed in the previous drawings, but has some male/female engaging means, or similar, to engage/disengage the second grip to/from the machine.

Above have been shown some embodiments of the invention. Several advantages are achieved with the embodiments.

One advantage achieved is that the machine is usable in both one-hand and two-hand modes. The machine is specially adapted for one-hand use, but the ergonomic grip, and tunnel for accommodating the fingers of both hands provide that the apparatus is also suitable for two-hand use. The possibility to switch between one-hand and two-hand modes is especially important during long monotonous working sessions.

Due to the displaceable structure of the second grip, the couplings of the flexible lines can be arranged very close to the center of weight of the machine. This contributes to the flexible use of the machine, as the turning/rotating of the machine around the disk is effortless. Due to the shown structure, the couplings can be arranged to the same distance from the center of the machine as in a conventional one-hand machine.

The form of the second grip contributes to user comfort as the hand is protected against cold/hot air from the couplings.

It will be obvious to a person skilled in the art that, as the technology advances, the inventive concept can be implemented in various ways. The invention and its embodiments are not limited to the examples described above but may vary within the scope of the claims.

The invention claimed is:

1. A handheld machine, comprising a first grip for receiving a first hand of a user of the machine, a second grip for receiving a second hand of the user of the machine, and at least one coupling for connecting the handheld machine to a flexible line, wherein the second grip extends at least partly over the coupling but is displaceable therefrom; and wherein the handheld machine and/or the second grip comprises a pivoting member for allowing the second grip to be displaced to a pivoted position.

2. A handheld machine, comprising a first grip for receiving a first hand of a user of the machine, a second grip for receiving a second hand of the user of the machine, and at least one coupling -for connecting the handheld machine to a flexible line, wherein the second grip extends at least partly over the coupling but is displaceable therefrom; and wherein the handheld machine comprises a tunnel below the second grip for receiving the thumbs of both hands.

3. A handheld machine, comprising a first grip for receiving a first hand of a user of the machine, a second grip for receiving a second hand of the user of the machine, and at least one coupling for connecting the handheld machine to a flexible line, wherein the second grip extends at least partly over the coupling but is displaceable from this position, and, wherein the handheld machine comprises an actuating lever, and the second grip is operationally coupled to the actuating lever such that when the second grip is pivoted to the pivoted position, the second grip locks the actuating lever to a non-operating state.

4. A handheld machine according to claim 3, wherein the second grip comprises an opening for receiving the actuating lever, and the actuating lever slides in the opening when pivoting the second grip.

5. A handheld machine according to claim 3, wherein the second grip comprises side portions extending to the sides of the coupling.

6. A handheld machine according to claim 3, wherein the second grip has an elongated structure and adapted to be gripped such that the thumb of the second hand sets on one side of the second grip and the other fingers of the second hand set on the other side of the second grip.

7. A handheld machine according to claim 3, wherein the second grip extends to the sides of the coupling such that the second grip prevents touching of the coupling or a line coupled to the coupling when the second grip is gripped with the second hand and a palm of the second hand is set against the top surface of the second grip.

8. A handheld machine according to claim 3, wherein the first grip comprises a circular handle for receiving the palm of the first hand.

9. A handheld machine according to claim 3, wherein the handheld machine comprises a working tool area and the first grip is positioned above the working tool area.

10. A handheld machine according to claim 3, wherein the working tool area is a round surface and the first grip is substantially circular, and a middle line of the substantially circular first grip is arranged in alignment with a middle axis of the round working tool area.

11. A handheld machine according to claim 3, wherein the second grip is configured to cover at least two coupling ports for respective flexible lines.

12. A handheld machine according to claim 3, wherein the handheld machine comprises a regulator for regulating the rotating speed of a motor of the machine, which regulator is an integrated part of a handle of the machine, the handle comprising the parts of the machine gripped by a user of the machine during usage of the machine.

13. A handheld machine according to claim 3, wherein the coupling for receiving the flexible line is configured to receive one of an electric line, a pneumatic line, a dust exhaust duct.

14. A handheld machine according to claim 3, wherein the handheld machine is a sander or a polisher and comprises a tool holder or tool pad, which has a circular, rectangular or triangular form.

* * * * *